(12) United States Patent
Jennery et al.

(10) Patent No.: US 10,789,272 B2
(45) Date of Patent: Sep. 29, 2020

(54) SCALABLE, DISTRIBUTED CONTAINERIZATION ACROSS HOMOGENOUS AND HETEROGENEOUS DATA STORES

(75) Inventors: Aidon P. Jennery, El Sobrante, CA (US); Brett E. Morris, Arlington, VA (US); Sriram R. Rao, Fremont, CA (US); Jin Wu, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 13/154,207

(22) Filed: Jun. 6, 2011

(65) Prior Publication Data

US 2012/0310982 A1    Dec. 6, 2012

(51) Int. Cl.
*G06F 7/00* (2006.01)
*G06F 16/27* (2019.01)

(52) U.S. Cl.
CPC .................. *G06F 16/278* (2019.01)

(58) Field of Classification Search
CPC ..................................... G06F 16/278
USPC .................. 707/705, 600, 999.102
See application file for complete search history.

(56) References Cited

U.S. PATENT DOCUMENTS

| | | | |
|---|---|---|---|
| 5,584,035 A * | 12/1996 | Duggan | G06F 3/04817 345/619 |
| 6,678,700 B1 | 1/2004 | Moore et al. | |
| 7,337,174 B1 * | 2/2008 | Craig | |
| 7,792,868 B2 * | 9/2010 | Finkelstein | G06F 16/954 707/798 |
| 7,840,619 B2 * | 11/2010 | Horn | G06F 16/22 707/829 |
| 7,877,362 B2 | 1/2011 | Gokhale et al. | |
| 8,271,443 B1 * | 9/2012 | Swift et al. | 707/640 |
| 8,650,159 B1 * | 2/2014 | Zhang | G06F 17/30156 707/664 |
| 8,903,772 B1 * | 12/2014 | Hayden | G06F 16/13 707/649 |
| 2005/0119988 A1 | 6/2005 | Buch et al. | |
| 2006/0036568 A1 * | 2/2006 | Moore | G06F 16/168 |

(Continued)

OTHER PUBLICATIONS

CDW, "Storage Management", Google, White Paper, 2009-2010, Total 8 pp.

(Continued)

*Primary Examiner* — Eliyah S. Harper
(74) *Attorney, Agent, or Firm* — Konrad Raynes Davda & Victor LLP; Janaki K. Davda

(57) ABSTRACT

Provided are techniques for using containers to store objects. One data store from a set of data stores is assigned as a primary data store, wherein the remaining data stores comprise secondary data stores. A container for a group is created on the primary data store. A unique identifier for the container is generated on the primary data store. Metadata for the container is stored on the primary data store. Zero or more objects are stored in the container on the primary data store. For each of the secondary data stores that have objects belonging to the group, a container is created in that secondary data store having the unique identifier, wherein the container spans the primary data store and the secondary data stores, and wherein the objects in the container do not span the primary data store and the secondary data stores.

15 Claims, 13 Drawing Sheets

(56) References Cited

U.S. PATENT DOCUMENTS

| | | | |
|---|---|---|---|
| 2007/0061382 A1* | 3/2007 | Davis | G06F 17/30908 |
| 2008/0021921 A1* | 1/2008 | Horn | 707/102 |
| 2008/0155191 A1 | 6/2008 | Anderson et al. | |
| 2009/0307448 A1 | 12/2009 | Gokhale et al. | |
| 2009/0319548 A1* | 12/2009 | Brown et al. | 707/101 |
| 2010/0250549 A1* | 9/2010 | Muller et al. | 707/741 |
| 2012/0054153 A1* | 3/2012 | Dickgiesser et al. | 707/623 |
| 2013/0254207 A1* | 9/2013 | Coburn, IV | G06F 3/0482 |
| | | | 707/740 |

OTHER PUBLICATIONS

Mell, P., T. Grance, and L. Badger, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", Recommendations of the National Institute of Standards and Technology, Jan. 2011, Total 7 pp.

\* cited by examiner

SCALABLE, DISTRIBUTED CONTAINERIZATION ACROSS HOMOGENOUS AND HETEROGENEOUS DATA STORES

BACKGROUND

Embodiments of the invention relate to scalable, distributed containerization across homogenous and heterogeneous data stores.

Many enterprise solutions gather information items together in particular groups, and, often, the items are stored on different computing systems and/or in different data stores. In order to group an arbitrary selection of items across various data stores usually requires either: 1) "tagging" items with container identifiers or 2) using data store relationship or container mechanisms to provide grouping. Tagging items in a data store, usually requires extension of the item data model. Using data store provided relationship or container mechanisms is the more common solution, whereby all data stores contain all containers, including the metadata that describes the group as part of or directly related to each container object.

However, there is a need in the art for improved grouping of items.

SUMMARY

Provided are a method, computer program product, and system for using containers to store objects. One data store from a set of data stores is assigned as a primary data store, wherein the remaining data stores comprise secondary data stores. A container for a group is created on the primary data store. A unique identifier for the container is generated on the primary data store. Metadata for the container is stored on the primary data store. Zero or more objects are stored in the container on the primary data store. For each of the secondary data stores that have objects belonging to the group, a container is created in that secondary data store having the unique identifier, wherein the container spans the primary data store and the secondary data store, and wherein the objects in the container do not span the primary data store and the secondary data stores.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
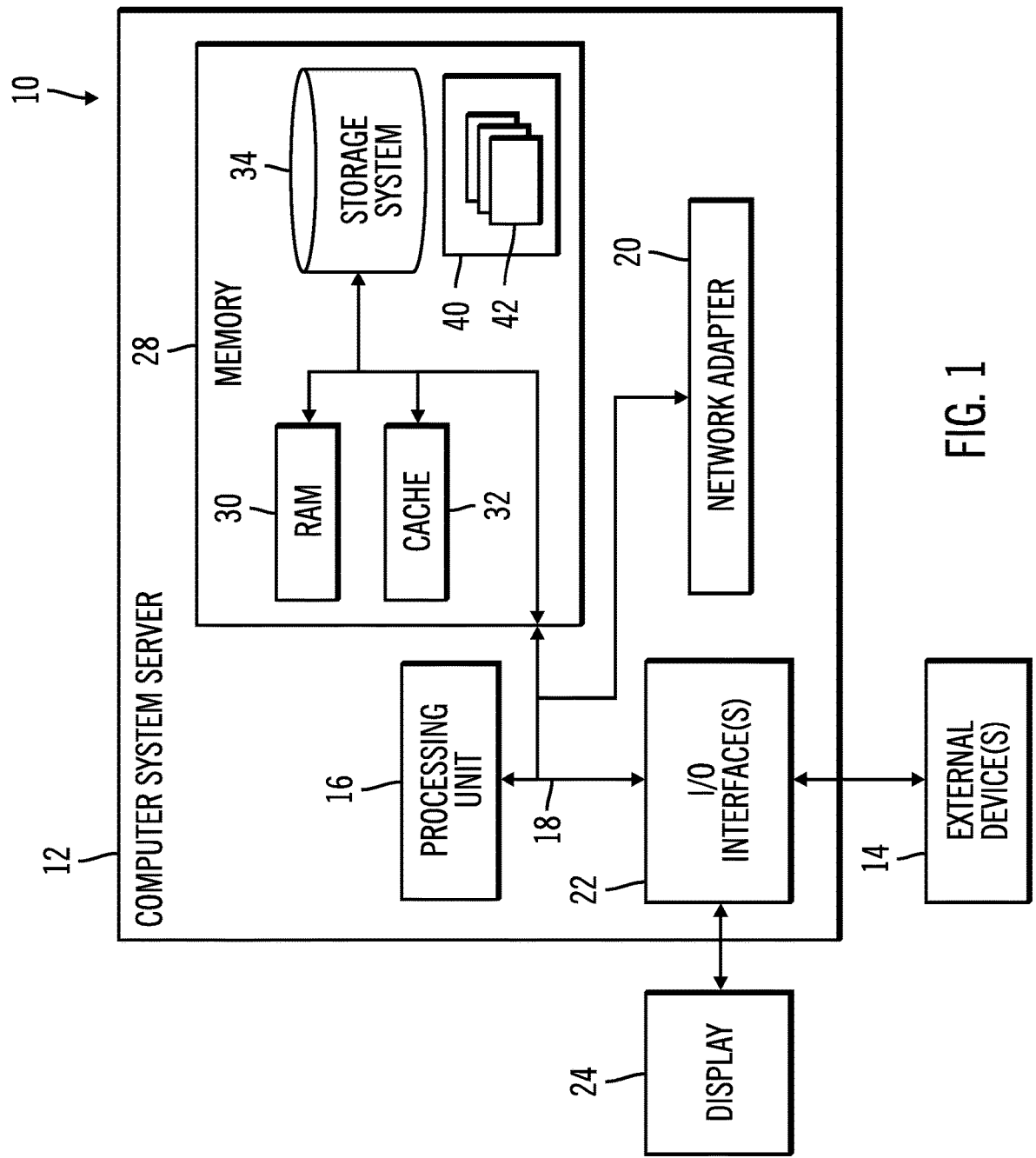
FIG. 1 depicts a cloud computing node in accordance with certain embodiments.

In the following description, reference is made to the accompanying drawings which form a part hereof and which illustrate several embodiments of the invention. It is understood that other embodiments may be utilized and structural and operational changes may be made without departing from the scope of the invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
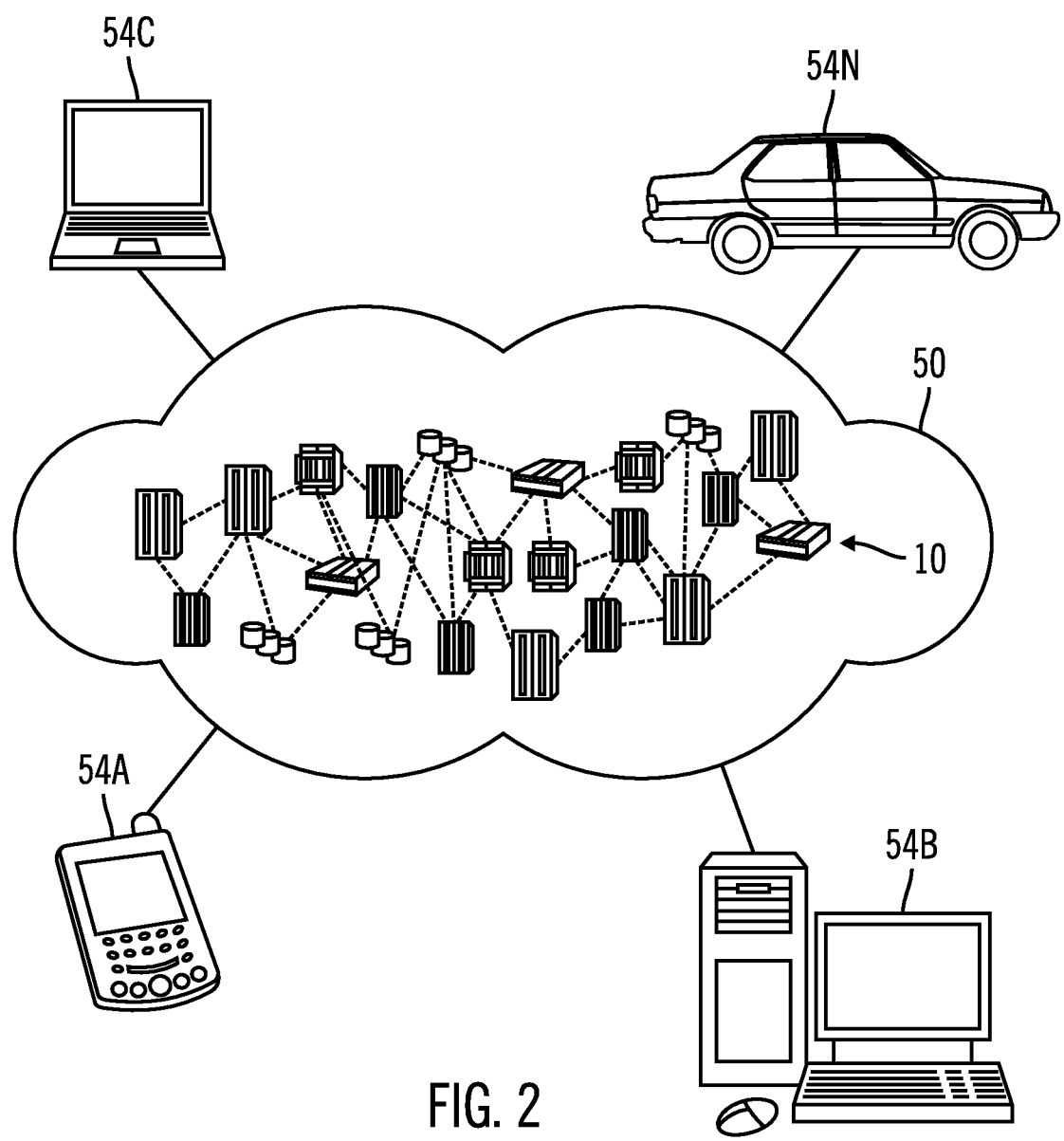
FIG. 2 depicts a cloud computing environment in accordance with certain embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
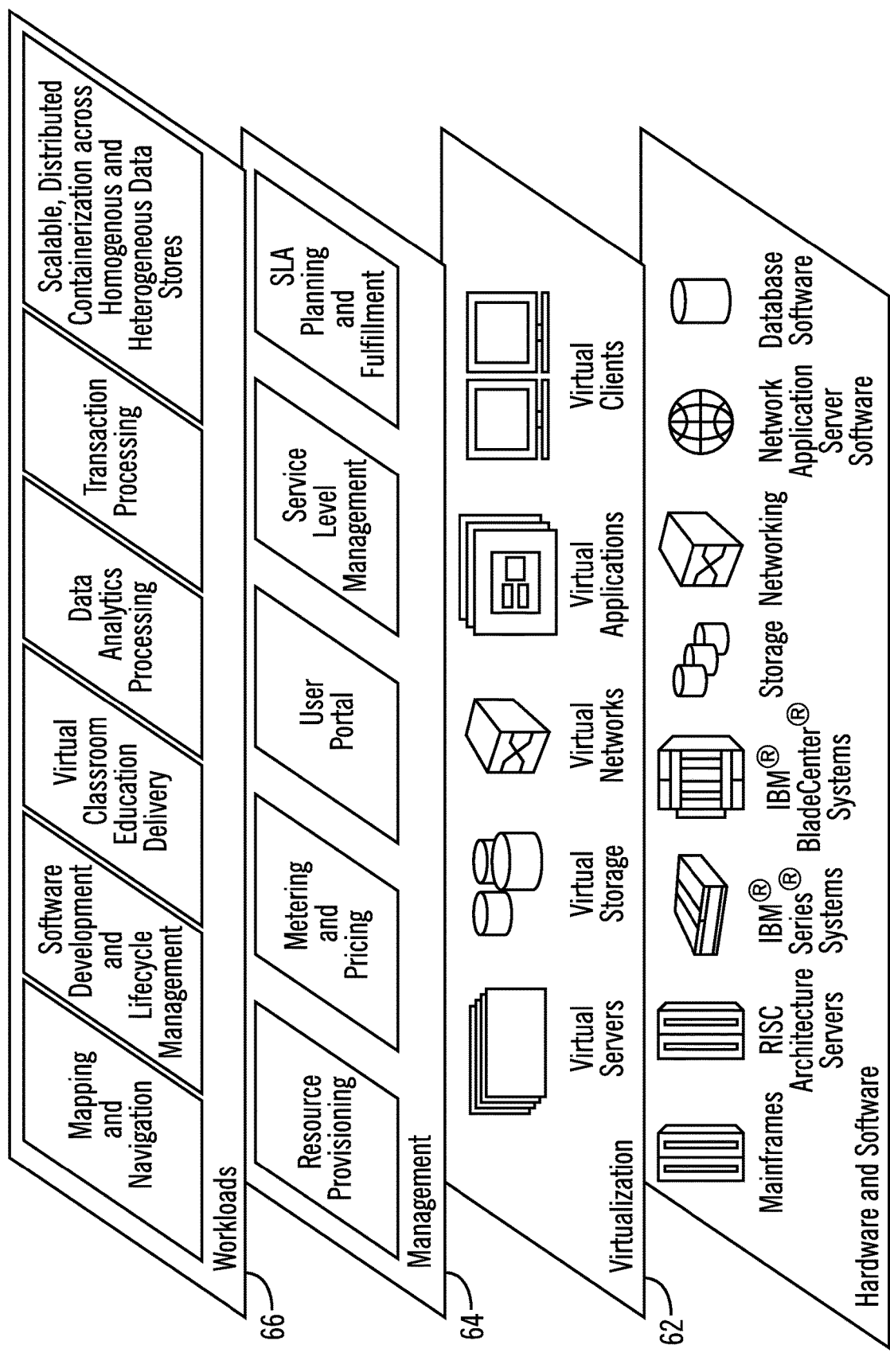
FIG. 3 depicts abstraction model layers in accordance with certain embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and scalable, distributed containerization across homogenous and heterogeneous data stores.

Thus, in certain embodiments, software, implementing scalable, distributed containerization across homogenous and heterogeneous data stores in accordance with embodiments described herein, is provided as a service in a cloud environment.

Figure 4:
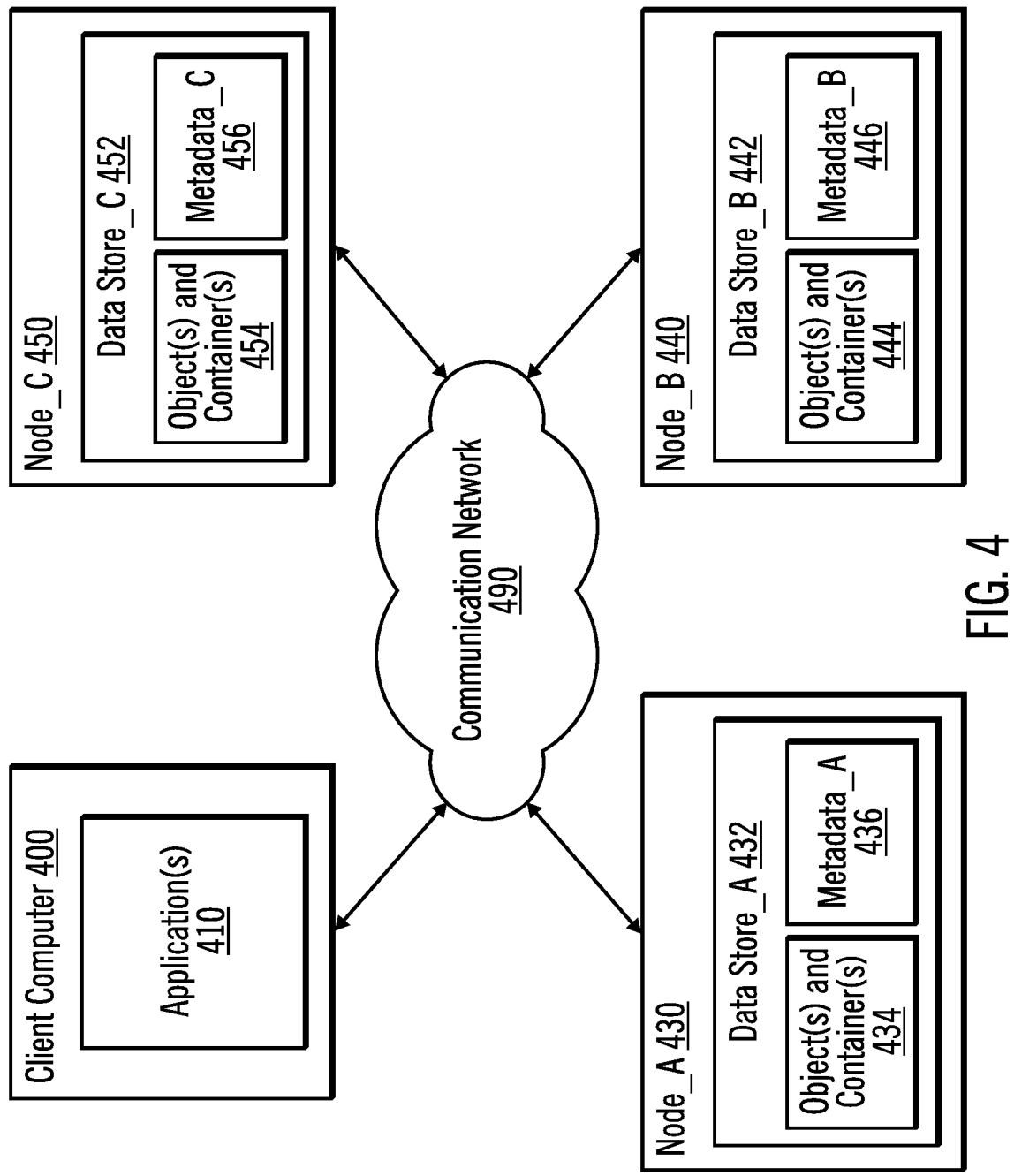
FIG. 4 illustrates a computing architecture in accordance with certain embodiments.

FIG. 4 illustrates a computing architecture in accordance with certain embodiments. A client computer 400, node_A 430, node_B 440, and node_C 450 are coupled to each other via a communication network 490. Although three nodes are illustrated, any number of nodes may be used in accordance with various embodiments. Client computer 400, node_A 430, node_B 440, and node_C 450 may each be a cloud computing node.

Client computer 400 includes one or more applications 410. Node_A 430 includes data store_A 432, which includes zero or more objects and zero or more containers 434 and metadata_A 436. NodeB 440 includes data store_B 442, which includes zero or more objects and zero or more containers 444 and metadata_B 446. Node_C 450 includes data store_C 452, which includes zero or more objects and zero or more containers 454 and metadata_C 456. A container and corresponding metadata go together in a logical sense. Although the metadata is illustrated separate from the containers, in certain embodiments, the metadata may be part of the containers.

Embodiments (a) use a data store generated unique identifier (ID) from a group container on one (e.g., a primary) data store as a "locator identifier" for containers of the same group on all other data stores, (b) store the full metadata of the group on the primary data store, while storing minimal metadata on the other data stores, (c) create the containers on non-primary (secondary) data stores when there are items for them to contain, and (d) remove the containers from the secondary data stores when they no longer have any items to contain, even if the grouping still exists in one or more other data stores.

One of the data stores 432, 442, 452 is designated as a primary data store. The remaining data stores 432, 442, 452 are designated as secondary data stores. Each of the data stores 432, 442, 452 may include zero or more containers. A container may be described as a potentially arbitrary grouping of items in a data store. Such a container is sometimes referred to as a "group". With embodiments, the data store unique ID that references containers on the primary data store is used as the value of a key attribute or property for the containers representing the same group on the secondary data stores. Moreover, the full metadata about a container resides on the primary data store and is not required on the secondary data stores. Embodiments provide for lazy creation and optimistic deletion of containers on secondary data stores.

Merely to enhance understanding of embodiments, various examples will be provided herein in which data store_A 432 is designated a primary data store, while data store_B 442 and data store_C 452 are designated as secondary data store.

Thus, in certain embodiments, the primary and secondary data stores are coupled to different nodes (e.g., servers). In certain embodiments, the primary and secondary data stores are coupled to a single node, which is coupled to the client computer 400. In certain other embodiments, the primary and secondary data stores are coupled directly to the client computer 400.

The data stores 432, 442, 452 may be any combination of homogenous and/or heterogeneous data sources. For example, one data store may be an eXtensible Markup Language (XML) data store, while another data store may be a relational database.

Figure 5:
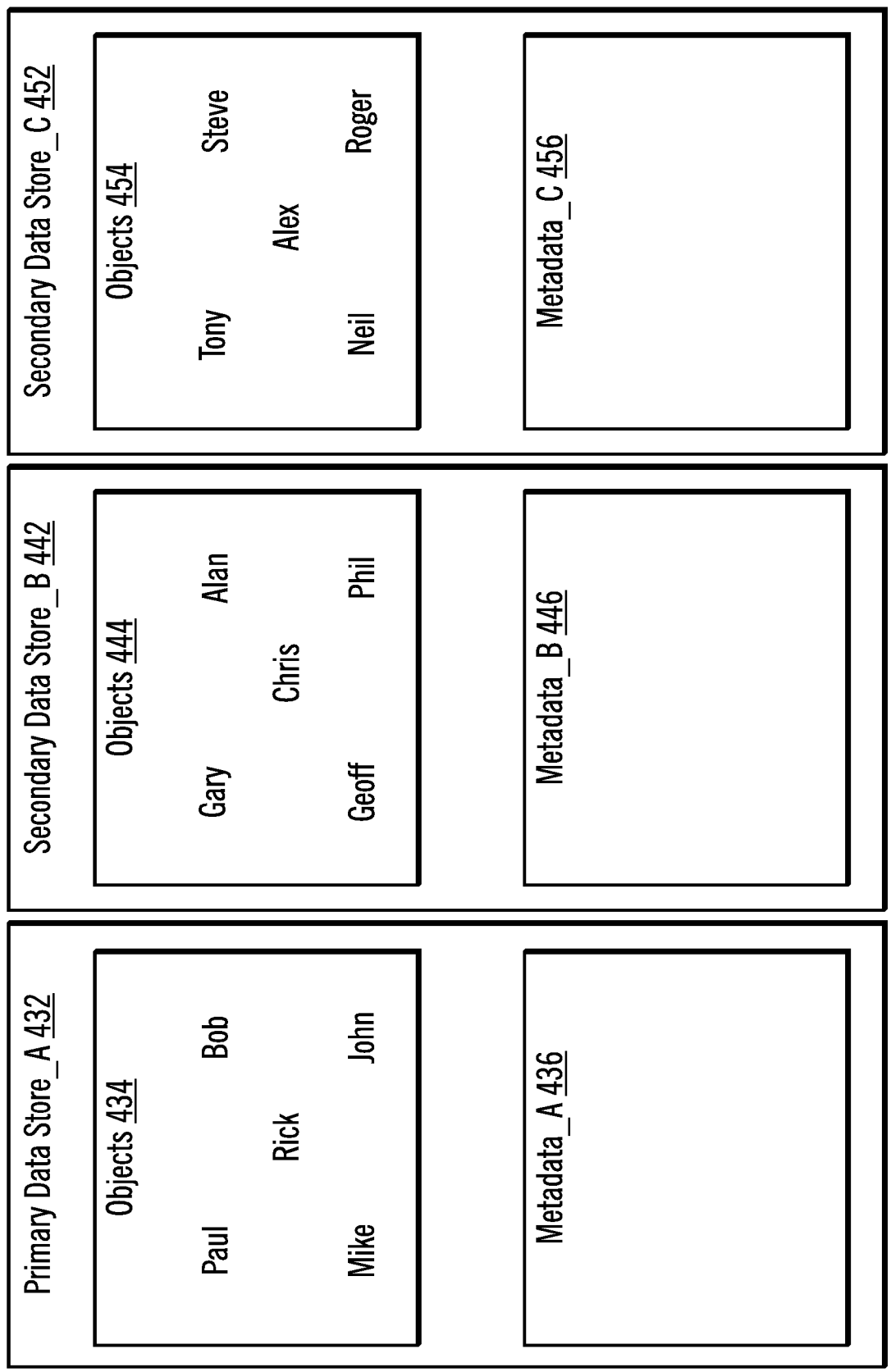
FIG. 5 illustrates data stores before containers have been created in accordance with certain embodiments.

FIG. 5 illustrates data stores before containers have been created in accordance with certain embodiments. Data stores 432, 442, and 452 each contain objects (also referred to as "items" or "data items") representing music recording artists. Because no containers have been created yet, there is no container metadata stored in metadata 436, 446, 456. For this example, assume that an application 410 has the desire to group these artists together according to various (application defined) criteria.

Figure 6:
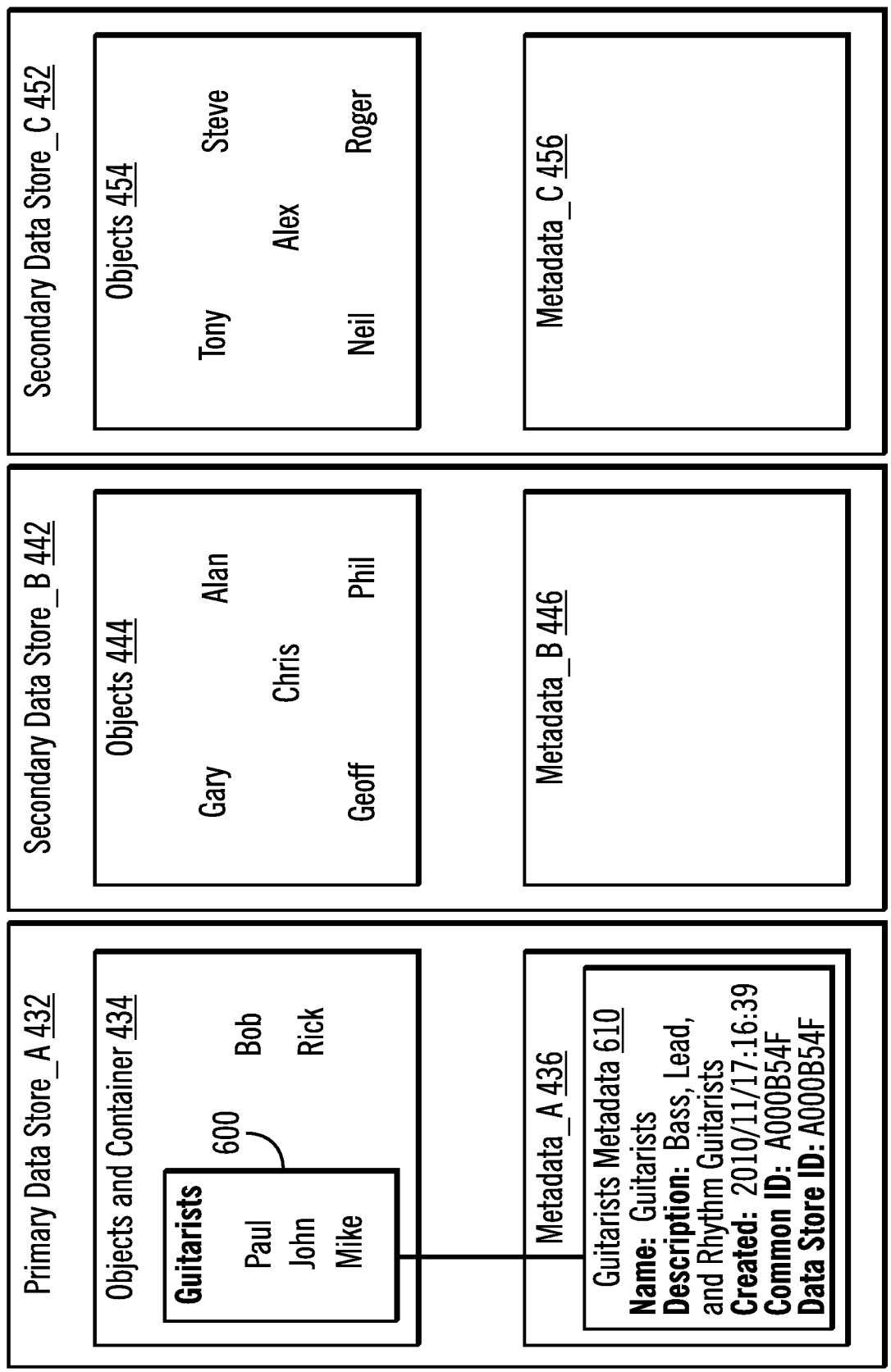
FIG. 6 illustrates a grouping of artists into a guitarists container in a primary data store in accordance with certain embodiments.

FIG. 6 illustrates a grouping of artists into a guitarists container 600 in a primary data store in accordance with certain embodiments. The application 410 groups objects (representing people) together. The application 410 initially identifies (i.e., locates or is provided with) objects representing guitarists (i.e., people who play guitar) and groups these objects into a guitarists container 600. In certain embodiments, the application 410 performs a search to identify the objects, creates the container, and adds the objects to the container. In certain alternative embodiments, the application 410 creates the container, searches to identify the objects, and adds the objects to the container.

With reference to FIG. 6, the application 410 first creates the guitarists container 600 on the primary data store_A 432, and then the application 410 stores application and system supplied guitarists metadata 610 for the guitarist container 600 on the primary data store_A 432. After creating the guitarists container 600, the application 410 adds objects (guitarists) to the guitarists container 600. In certain embodiments, a container is created with metadata, and then objects are added to the container.

The guitarists metadata 610 includes a name of the container, a description of the container, the date the container was created, a common identifier (ID) for the container, and a data store ID for the container. In certain embodiments, the data store ID is a data store generated unique ID on the primary data store. In certain alternative embodiments, the data store ID is application generated. In certain embodiments, on the primary data store_A 432, the common ID and the data store ID are the same to enable simpler searching.

Figure 7:
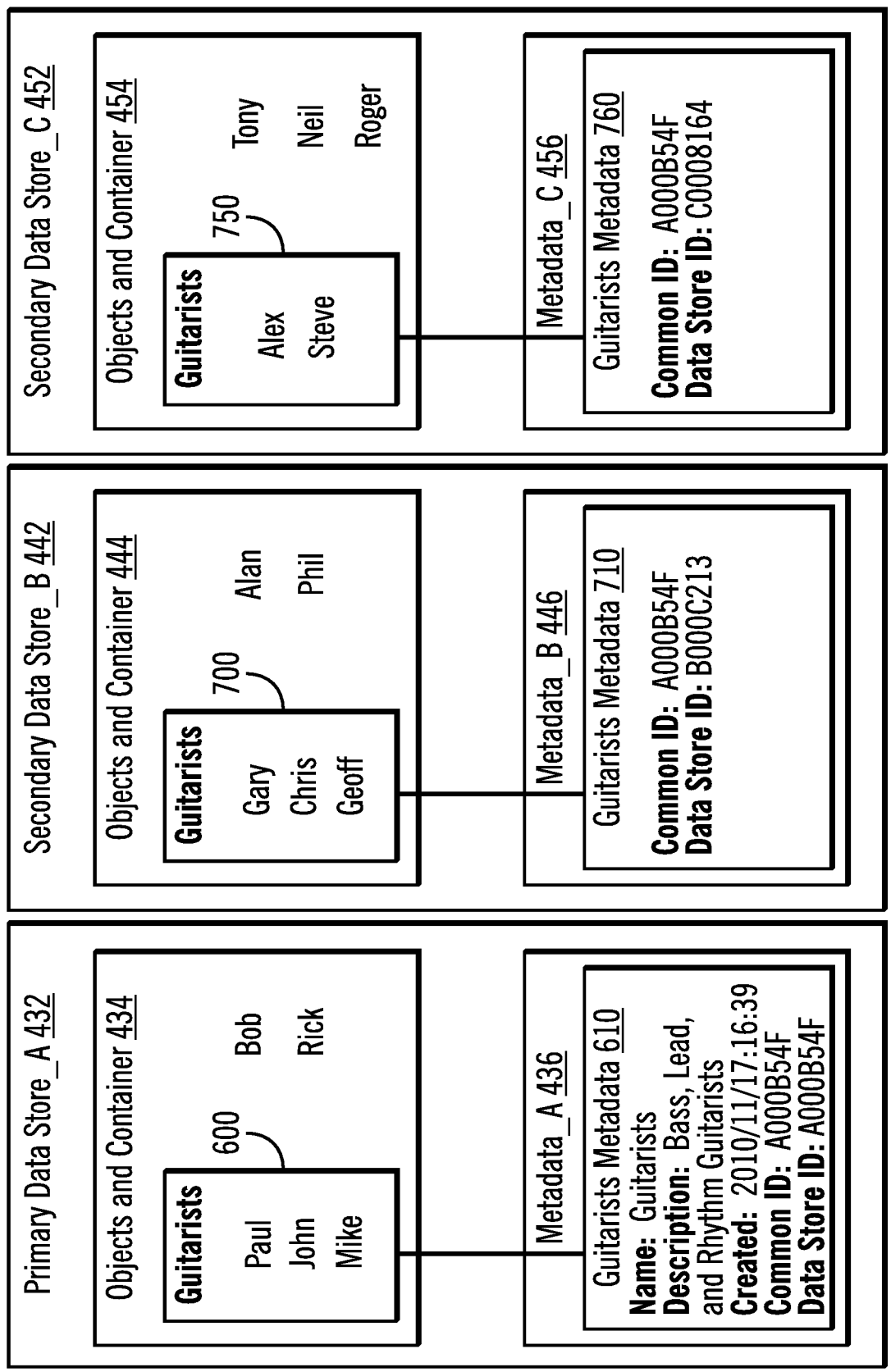
FIG. 7 illustrates a grouping of artists into guitarists containers in secondary data stores in accordance with certain embodiments.

FIG. 7 illustrates a grouping of artists into guitarists containers 700 in secondary data stores in accordance with certain embodiments. The application 410 identifies (i.e., locates or is provided with) objects representing guitarists on the secondary data stores. In the example of FIG. 7, the application 410 identifies objects representing guitarists in secondary data store_B 442 and creates guitarists container 700. Also, the application 410 identifies objects representing guitarists on the secondary data store_C 452 and creates guitarists container 750. The application 410 stores minimal metadata for the secondary data stores. In particular, the application stores guitarists metadata 710 on the secondary data store_B 442 and stores guitarists metadata 760 on the secondary data store_C 452. The guitarists metadata 710 includes a common ID, which is the same common ID stored in the guitarists metadata 610 on the primary data store_A 432. In certain embodiments, the metadata in a secondary data store includes a data store ID that is unique to the secondary data store. For example, the guitarists metadata 710 includes a data store ID that is unique to the secondary data store_B442. For this example, the guitarists metadata 760 includes a common ID, which is the same common ID stored in the guitarists metadata 610 on the primary data store_A 432, and includes a data store ID that is unique to the secondary data store_C 452.

Once the guitarists containers 700, 750 are created, the application 410 adds objects (guitarists) to the guitarists containers 700, 750.

Thus, the grouping metadata is all stored on the primary data store, and the metadata stored for the secondary data stores is the common ID. In other words, the data models for primary containers and secondary containers are different, and the data model for the secondary containers is lightweight. The common ID is also stored as part of the primary container metadata, which enables searching and enables executing queries using the common ID regardless of the data store on which the search is being done (i.e., primary vs. secondary).

In certain embodiments, the data stores allow the application 410 to provide the data store unique ID, and the unique ID that is generated for the primary data store is used on the secondary data stores, and no common ID is used. Essentially, the two IDs (data store ID and common ID) are merged on each data store into one system attribute or property (represented by the data store unique ID), and the data store unique ID is common across data stores for any given group.

In certain alternative embodiments, the data store provides no standard unique ID mechanism (either data store or application generated), and the two IDs (data store ID and common ID) are again merged on all data stores into a single application attribute/property, and the value of the merged IDs is common across data stores for any given group.

As can be seen in the example of FIG. 7, embodiments provide distributed containers storing objects that are already on the distributed systems themselves, and the objects do not span multiple data stores, although the logical containers do span multiple data stores.

Figure 8:
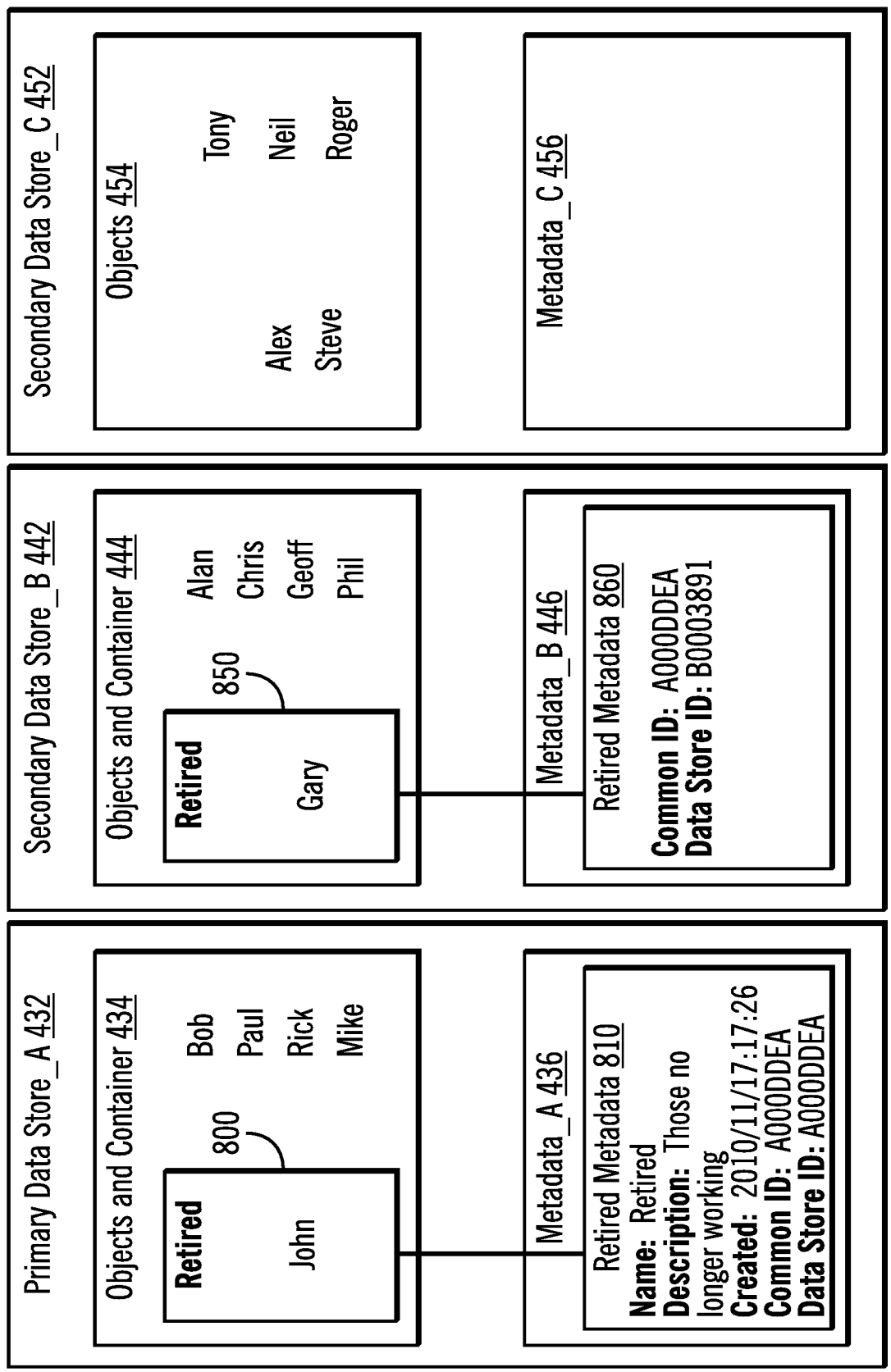
FIG. 8 illustrates lazy creation of a container in accordance with certain embodiments.

FIG. 8 illustrates lazy creation of a container in accordance with certain embodiments. In FIG. 8, the containers shown exist along side other containers (e.g., the guitarists containers) on each data store, but only those related to retired people are shown for clarity in FIG. 8.

The application 410 groups objects (representing people who have retired) together. In particular, the application 410 would identify John on the primary data store_A 432 and Gary on the secondary data store_B 442 as retired. The application 410 creates the retired container 800 on the primary data store_A 432, and then the application 410 stores application and system supplied retired metadata 810 for the retired container 800 on the primary data store_A 432. The application 410 also adds the object (retiree "John") to the retired container 800.

The retired metadata 810 includes a name of the container, a description of the container, the date the container was created, a common ID for the container, and a data store ID for the container.

The application 410 creates the retired container 850 on the secondary data store_B 442, and then the application 410 stores retired metadata 860 for the retired container 850 on the secondary data store_B 442. The application 410 also adds the object (retiree "Gary") to the retired container 850. The retired metadata 860 includes a common ID and a data store ID.

In FIG. 8, there are no retired people on the secondary data store_C 452. Therefore, the application does not create a retired container or retired metadata for the secondary data store_C 452. When the application 410 detects one or more retired people on the secondary data store_C 452, the application 410 will create the retied container and the retired metadata on the secondary data store_C 452 at that time. In various embodiments, the detection may be application dependent. For example, the detection may be the result of 1) an end-user search; 2) a scheduled, repeating search; or 3) the application being informed by data stores when new objects are created and when existing objects are modified or removed. Thus, the creation of the retired container on the secondary data store_C 452 represents lazy creation of a container.

Figure 9:
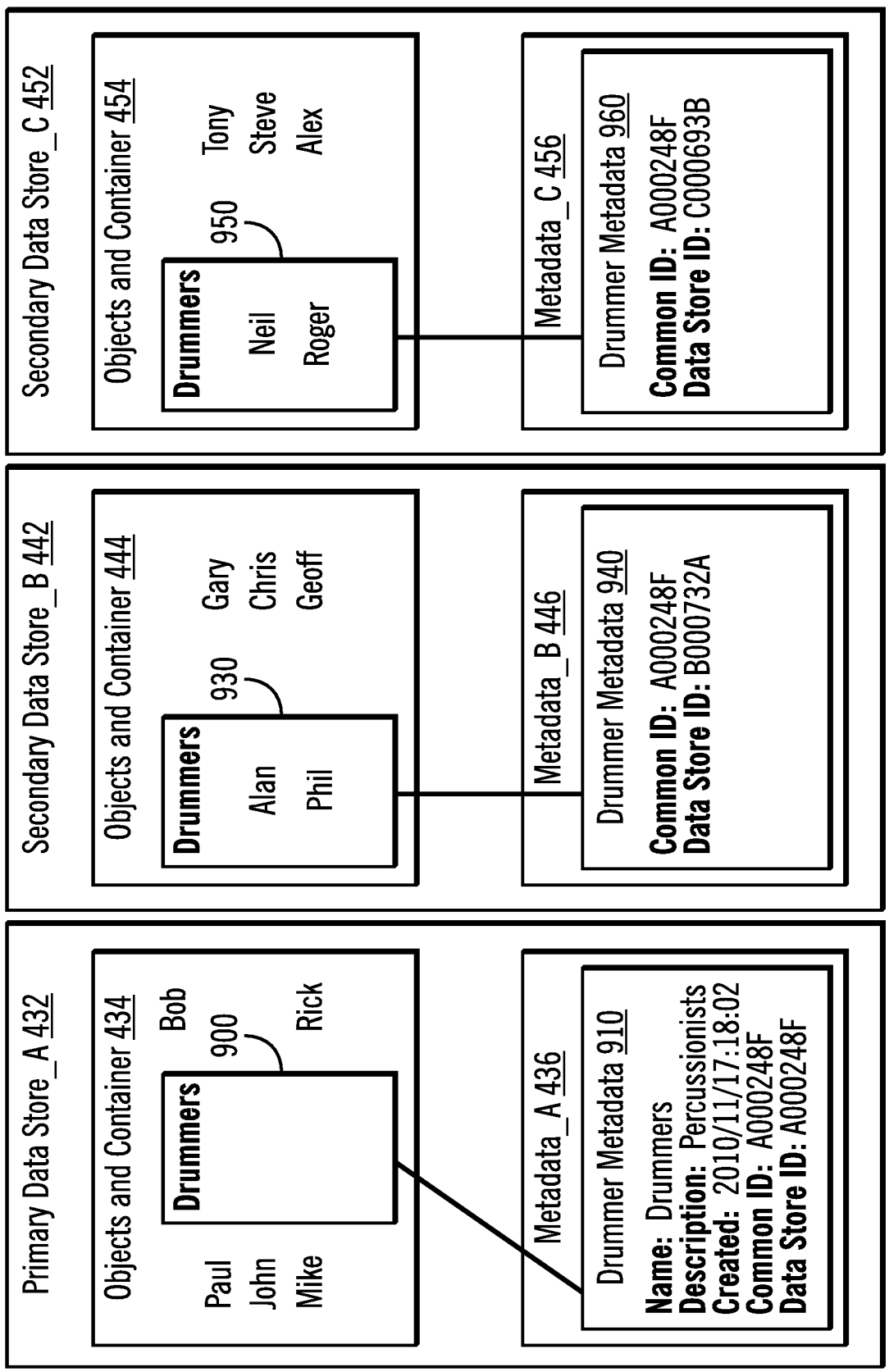
FIG. 9 illustrates creation of a container when the primary data store does not have objects for that container in accordance with certain embodiments.

FIG. 9 illustrates creation of a container when the primary data store does not have objects for that container in accordance with certain embodiments. In FIG. 9, the containers shown exist along side other containers (e.g., the guitarists and retired containers) on each data store, but only those related to drummers are shown for clarity in FIG. 9.

The application 410 groups objects (representing people who are drummers) together. In particular, the application 410 would identify objects representing drummers on the secondary data store_B 442 and the secondary data store_C 452. The primary data store_A 432 does not have objects representing drummers.

The application 410 creates the drummers container 900 on the primary data store_A 432, and then the application 410 stores application and system supplied retired metadata 910 for the retired container 800 on the primary data store_A 432. The drummers metadata 910 includes a name of the container, a description of the container, the date the container was created, a common ID for the container, and a data store ID for the container.

Then, the application 410 creates the drummers container 930, stores drummers metadata 940 for the drummers container 930 on the secondary data store_B 442. The application 410 also adds objects representing drummers to the drummers container 930. The drummers metadata 930 includes a common ID and a data store ID.

The application 410 creates the drummers container 950, stores drummers metadata 960 for the drummers container 950 on the secondary data store_C 452. The application 410 also adds objects representing drummers to the drummers container 950. The drummers metadata 960 includes a common ID and a data store ID.

In FIG. 9, for a group that has no objects on the primary data store, the container for that group still exists, and there are no items in the container. This is because the group metadata and the metadata of the container on the primary data store are the same, and the container is associated with the group metadata.

Figure 10:
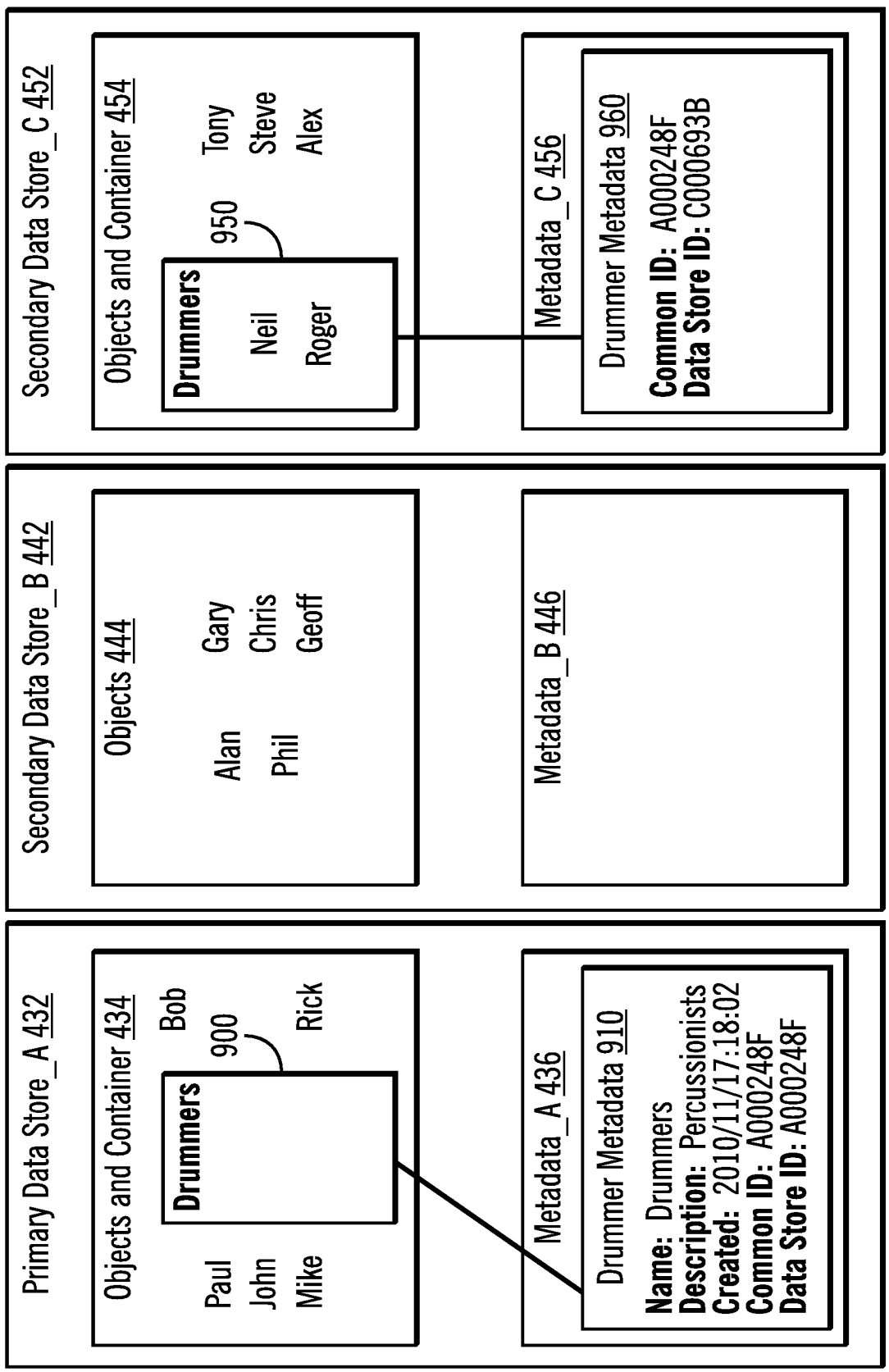
FIG. 10 illustrates a change in status of an object in accordance with certain embodiments.

FIG. 10 illustrates a change in status of an object in accordance with certain embodiments. In FIG. 10, the containers shown exist along side other containers (e.g., the guitarists and retired containers) on each data store, but only those related to drummers are shown for clarity in FIG. 10.

For the example of FIG. 10, Alan and Phil both decide to stop being drummers, and so the status of the objects representing them changes. The application 410 detects the change in status, and the application removes the objects representing Alan and Phil from the drummers container on the secondary data store_B 442. Also, as there are no longer any members of the drummers container on the secondary data store_B 442, the application 410 removes the drummers container in the on the secondary data store_B 442 and removes the drummer metadata 910. This is the optimistic delete approach.

The lazy create and optimistic delete approaches ensure that if there is a member of the group in a secondary data store, then there is a container present on the secondary data store; and, if there is no member of the group on the secondary data store, then there is no container present on the secondary data store. This approach provides consistency and efficiency of searching and removal of groups.

Figure 11:
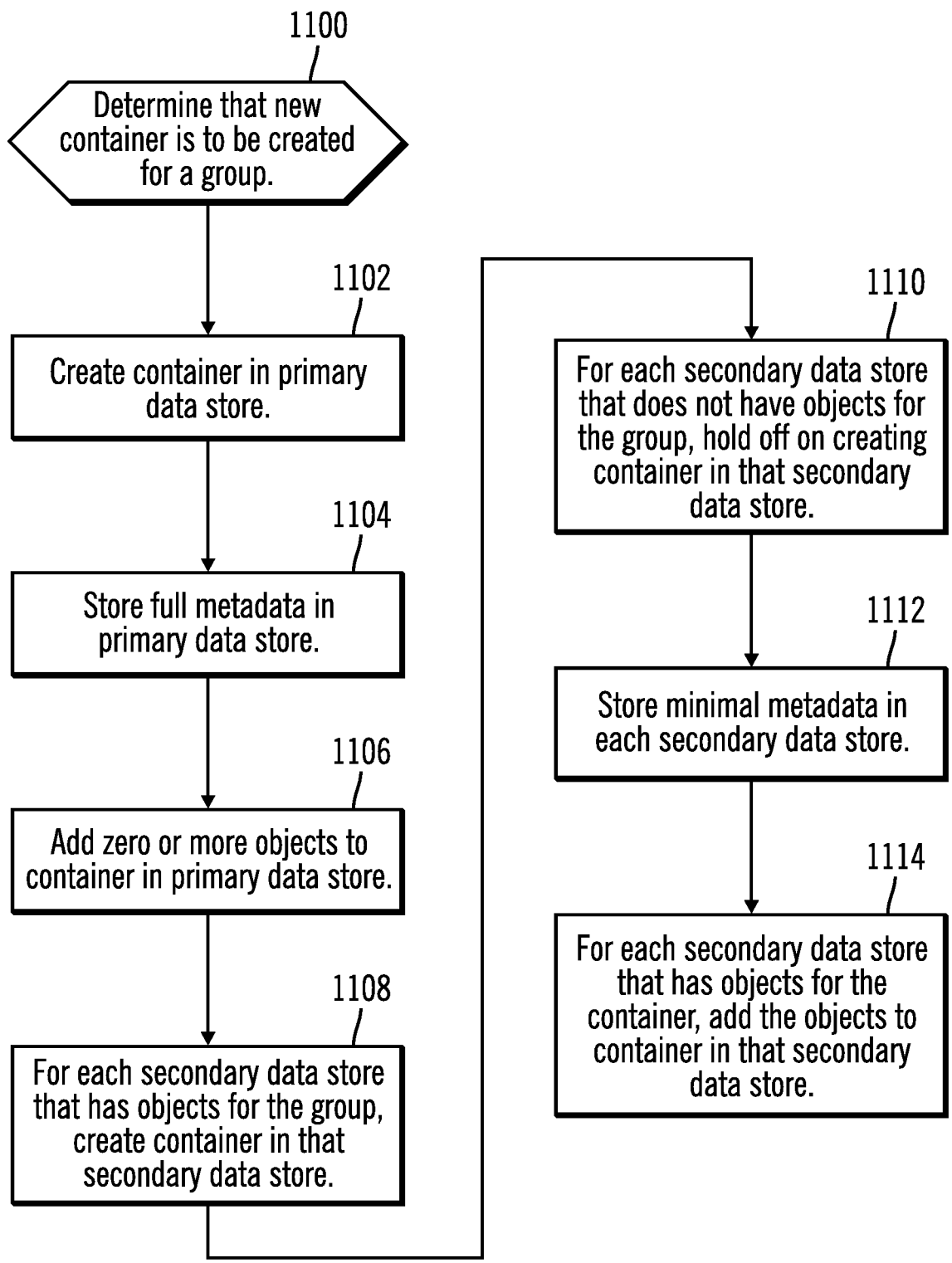
FIG. 11 illustrates logic, in a flow diagram, for creating a new container in accordance with certain embodiments.

FIG. 11 illustrates logic, in a flow diagram, for creating a new container in accordance with certain embodiments. Control begins at block 1100 with the application 410 determining that a new container is to be created for a group (e.g., drummers, guitarists, etc.). In block 1102, the application 410 creates the container on the primary data store. In block 1104, the application 410 stores the full metadata on the primary data store. In certain embodiments, the processing of blocks 1102 and 1104 may be performed at the same time as an atomic operation for efficiency/performance. In block 1106, the application 410 adds zero or more objects to the container on the primary data store. That is, even if the primary data store does not include members of the container, the container is still created on the primary data store. Adding zero or more objects to the container includes identifying (e.g., with a search) the objects to be added to the container.

In block 1108, for each secondary data store that has objects for the group, the application 410 creates a container in that secondary data store. In block 1110, for each secondary data store that does not have objects for the group, the application 410 holds off on creating the container in that secondary data store. This is a lazy create approach. In block 1112, the application 410 stores minimal metadata in each secondary data store. In certain embodiments, the processing of blocks 1108 and 1112 may be performed at the same time as an atomic operation for efficiency/performance. In block 1114, for each secondary data store that has objects for the container, the application 410 adds the objects to container in that secondary data store.

Figure 12:
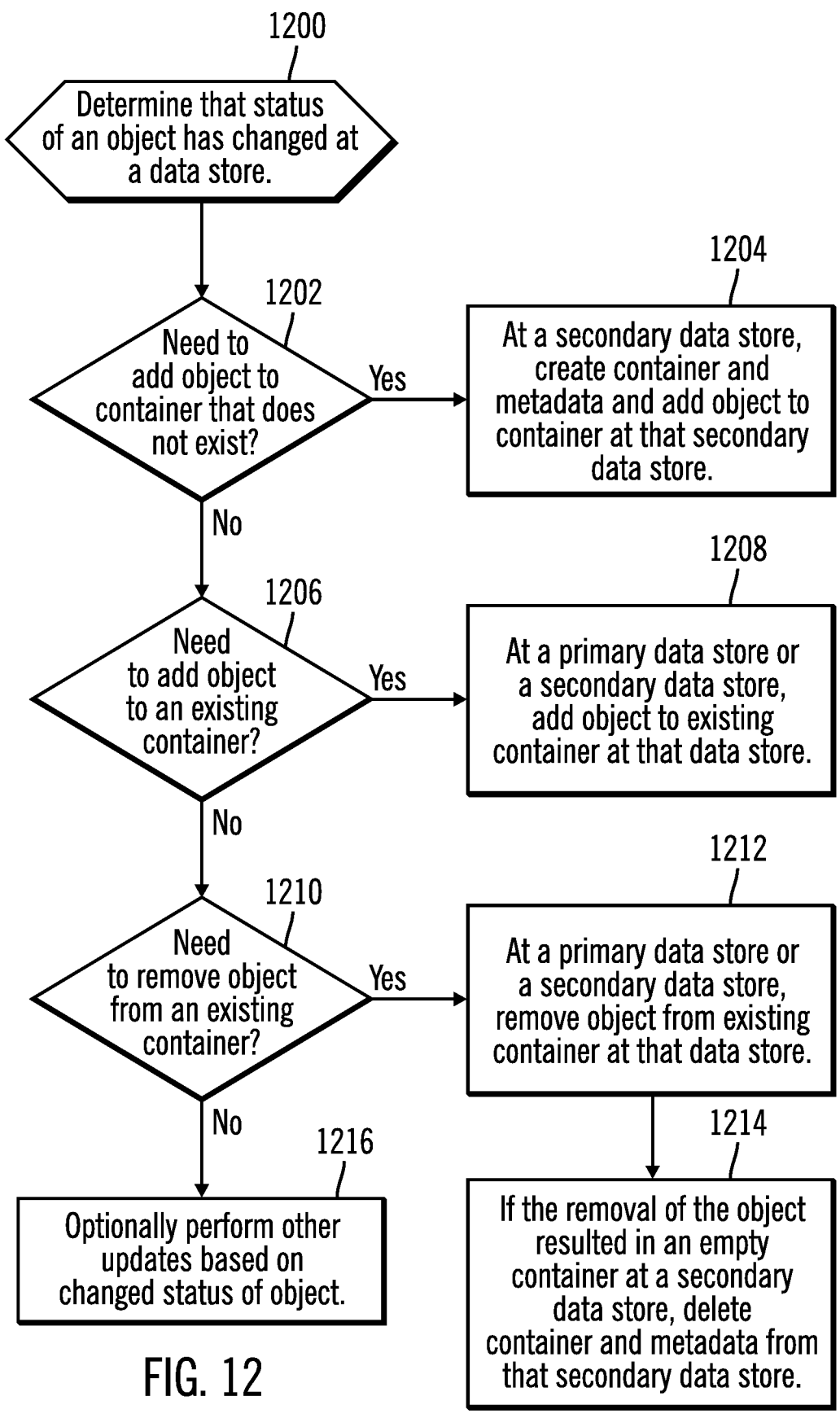
FIG. 12 illustrates logic, in a flow diagram, for processing a change in status of an object in accordance with certain embodiments.

FIG. 12 illustrates logic, in a flow diagram, for processing a change in status of an object in accordance with certain embodiments. Control begins at block 1200 with the application 410 determining that the status of an object has changed at a data store. For example, the change in status may be that a person who is designated a drummer is no longer a drummer and is removed from a container (which may also result in the container being removed if the container is empty on a secondary data store), that an object is to be removed from the data store and is removed from the container (which may also result in the container being removed if the container is empty on a secondary data store), that a person has decided to retire and is added to a container (either existing or newly created), or that a new object is added to a data store and may be added to a container (either existing or newly created).

In block 1202, the application 410 determines whether the object is to be added to a container that does not exist. If so, processing continues to block 1204, otherwise, processing continues to block 1206. In block 1204, at a secondary data store, the application 410 creates a container and metadata, and the application 410 adds the object to the container at that secondary data store. For example, with reference to FIG. 8, if the status of the object representing Tony becomes retired, then a new retired container is created on the secondary data store_C 452, and the object representing Tony is added to the new retired container. Also, if a new object is added to a data store, a new container may be created and that new object added to the new container. This is an example of lazy creation of a container at a secondary data store.

A container is created at the primary data store even if there are no objects for that container. Therefore, when an object is to be added to a container at the primary data store, the container exists.

In block 1206, the application 410 determines whether the object is to be added to an existing container. If so, processing continues to block 1208, otherwise, processing continues to block 1210. An object may be added to an existing container at the primary data store or a secondary data store. In block 1208, at the primary data store or a secondary data store, the application 410 adds the object to the existing container at that data store. For example, with reference to FIG. 9, if the object representing Bob becomes a drummer, the object representing Bob is added to the drummers container 900. Also, if a new object is added to a data store, the new object may be added to an existing container.

In block 1210, the application 410 determines whether the object is to be removed from an existing container. If so, processing continues to block 1212, otherwise, processing continues to block 1216. An object may be removed from an existing container at the primary data store or a secondary data store. In block 1212, at the primary data store or a secondary data store, the application 410 removes the object from the existing container at that data store. In block 1214, if the removal of the object (in block 1212) resulted in an empty container at a secondary data store, the application 410 deletes the container and corresponding metadata from that secondary data store. This is optimistic deletion of a container on a secondary data store. Note that an empty container in a primary data store is not deleted. For example, with reference to FIGS. 9 and 10, Alan and Phil both decide to stop being drummers, and so the status of the objects representing them changes. For this example, assume that the object representing Alan is processed first by being removed from the drummers container 930. Then, the object representing Phil is still in the drummers container 930. Next, the object representing Phil is processed by being removed from the drummers container 930. The drummers container 930 is empty, so the drummers container 930 is removed along with the corresponding metadata 940 at the secondary data store_B 442.

In block 1216, the application 410 optionally performs other updates based on the changed status of the object.

Thus, the application 410 updates the existing containers based on the changed status of the object. The application 410 may create a container on a secondary data store (i.e., lazy creation of a container). The application 410 may add an object to a container or may remove an object from a container on a particular data store. The application 410 may delete a container (i.e., optimistic deletion) on a secondary data store.

In certain embodiments, when objects are added to a container, a pointer or some other reference to the object is added to the container, rather than adding the actual object to the container.

The containerization approach may be employed hierarchically. In certain embodiments, containers are a grouping concept, and cases have folders, a nested grouping concept. Both cases and folders use the lightweight data model on the secondary data stores, the common ID across primary and secondary data stores, and the lazy create and optimistic delete approaches. Certain embodiments employ these concepts to an arbitrary level of nesting.

These concepts together provide for a grouping/containerization system that minimizes cross data store transactions and maximizes restartability of operations. For a rename of the group, for example, the application 410 changes the name of the container on the primary data store, as that is the only location where the name of the container is stored. The secondary data stores do not need to participate in rename or other operations that only modify the group metadata.

With embodiments, if an add operation or a remove operation of an object fails part way through on a particular data store, the operation is restarted.

Embodiments also provide security. With embodiments, the security controls (either application or data store provided) are applied on the container on the primary data store, and the security checks are executed for all users against containers on the primary data store. If a user has the appropriate access to a container on the primary data store, then no further security checks are required to access the containers on the secondary data stores that represent the same container. Thus, only one security check is required, no matter how many data stores are involved in the group operation. As all access is governed by the container on the primary data store, any security access changes are performed on the primary data store only, and no cross data store transaction is required. Thus, embodiments avoid cross data store transactions when changing security access. With embodiments, the use of a primary data store and its ability to "govern" the group across data stores is applied to other functionality in addition to simple metadata and security.

Figure 13:
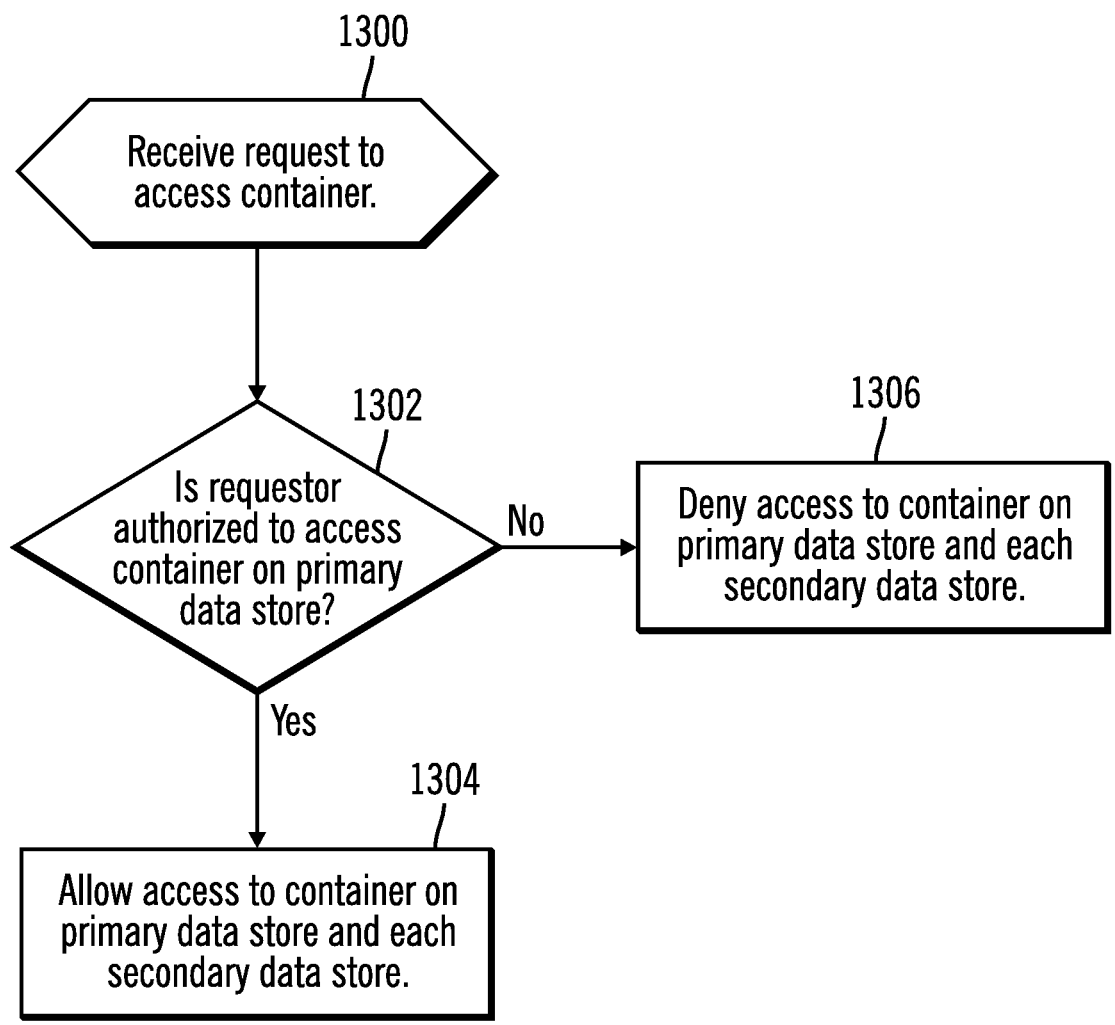
FIG. 13 illustrates logic, in a flow diagram, for security in accordance with certain embodiments.

FIG. 13 illustrates logic, in a flow diagram, for security in accordance with certain embodiments. In various embodiments, the processing of FIG. 13 may be performed by the application 410 or by a data store. Control begins at block 1300 with receipt of a request to access a container from a requestor. The requestor may be a user or another application. In block 1302, it is determined whether the requestor is authorized to access the container on the primary data store. If so, processing continues to block 1304, otherwise, processing continues to block 1306. In block 1304, access to the container on the primary data store and each secondary data store is allowed. In block 1306, the access to the container on the primary data store and each secondary data store is denied.

Embodiments provide a mechanism for the containerization of items across different data sources and provide economies of storage, operation and searching/retrieval in a scalable model. That is, embodiments provide a scalable, distributed containerization across homogenous and heterogeneous data sources.

Embodiments provide efficient location of container objects representing a group when moving between data stores, have unpredictable storage requirements, and provide efficient searching/retrieval.

Embodiments provide a mechanism for distributed containerization that requires no requisites on how the data objects are stored on any of the data stores and provides a mechanism for efficient virtual containerization across heterogeneous storage systems.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The components (e.g., the application) of embodiments may be implemented as hardware (e.g., hardware logic or circuitry), software, or a combination of hardware and software.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer-implemented method, comprising operations for:
    in response to determining that a primary data store does not store a primary object for a group, creating, in the primary data store, a primary container;
    in response to determining that a secondary data store does store a secondary object for the group, creating, in the secondary data store, a secondary container to contain the secondary object for the group;
    in response to determining that the secondary data store does not store the secondary object for the group, determining that the secondary container is not to be created; and
    in response to another determining that the secondary data store does store the secondary object for the group, creating, in the secondary data store, the secondary container to contain the secondary object for the group; and
    in response to receiving a request to access the secondary container, allowing access to the secondary container based on security controls of the primary container without regard to security controls of the secondary container.

2. The computer-implemented method of claim 1, further comprising operations for:
    deleting the secondary container when the secondary container becomes empty.

3. The computer-implemented method of claim 1, further comprising operations for:
    changing a name of the group in the primary data store, without changing the name of the group in the secondary data store, and without changing a common identifier of the primary container and the secondary container.

4. The computer-implemented method of claim 1, wherein a Software as a Service (SaaS) is provided to perform the operations of the computer-implemented method.

5. A system, comprising:
    a processor; and
    storage coupled to the processor, wherein the storage stores computer instructions, and wherein the computer instructions, when executed by the processor, perform operations, the operations comprising:
    in response to determining that a primary data store does not store a primary object for a group, creating, in the primary data store, a primary container;
    in response to determining that a secondary data store does store a secondary object for the group, creating, in the secondary data store, a secondary container to contain the secondary object for the group;
    in response to determining that the secondary data store does not store the secondary object for the group, determining that the secondary container is not to be created; and
    in response to another determining that the secondary data store does store the secondary object for the group, creating, in the secondary data store, the secondary container to contain the secondary object for the group; and
    in response to receiving a request to access the secondary container, allowing access to the secondary container based on security controls of the primary container without regard to security controls of the secondary container.

6. The system of claim 5, wherein the operations further comprise:
    deleting the secondary container when the secondary container becomes empty.

7. The system of claim 5, wherein the operations further comprise:
    changing a name of the group in the primary data store, without changing the name of the group in the secondary data store, and without changing a common identifier of the primary container and the secondary container.

8. The system of claim 5, wherein a Software as a Service (SaaS) is provided to perform the operations of the system.

9. A non-transitory computer readable storage medium having computer readable program code embodied therewith, the computer readable program code, when executed by a processor of a computer, is configured to perform operations for:
  in response to determining that a primary data store does not store a primary object for a group, creating, in the primary data store, a primary container;
  in response to determining that a secondary data store does store a secondary object for the group, creating, in the secondary data store, a secondary container to contain the secondary object for the group;
  in response to determining that the secondary data store does not store the secondary object for the group,
    determining that the secondary container is not to be created; and
    in response to another determining that the secondary data store does store the secondary object for the group, creating, in the secondary data store, the secondary container to contain the secondary object for the group; and
  in response to receiving a request to access the secondary container, allowing access to the secondary container based on security controls of the primary container without regard to security controls of the secondary container.

10. The non-transitory computer readable storage medium of claim 9, wherein the computer readable program code, when executed by the processor of the computer, is configured to perform further operations for:
  deleting the secondary container when the secondary container becomes empty.

11. The non-transitory computer readable storage medium of claim 9, wherein the computer readable program code, when executed by the processor of the computer, is configured to perform further operations for:
  changing a name of the group in the primary data store, without changing the name of the group in the secondary data store, and without changing a common identifier of the primary container and the secondary container.

12. The non-transitory computer readable storage medium of claim 9, wherein a Software as a Service (SaaS) is configured to perform the operations of the non-transitory computer readable storage medium.

13. The computer-implemented method of claim 1, wherein the primary container stores metadata about the group.

14. The system of claim 5, wherein the primary container stores metadata about the group.

15. The non-transitory computer readable storage medium of claim 9, wherein the primary container stores metadata about the group.

* * * * *